United States Patent
Lam

(10) Patent No.: US 7,966,547 B2
(45) Date of Patent: Jun. 21, 2011

(54) MULTI-BIT ERROR CORRECTION SCHEME IN MULTI-LEVEL MEMORY STORAGE SYSTEM

(75) Inventor: Chung H. Lam, Peekskill, NY (US)

(73) Assignee: International Business Machines Corporation, Armonk, NY (US)

( * ) Notice: Subject to any disclaimer, the term of this patent is extended or adjusted under 35 U.S.C. 154(b) by 1022 days.

(21) Appl. No.: 11/772,356

(22) Filed: Jul. 2, 2007

(65) Prior Publication Data
US 2009/0013223 A1    Jan. 8, 2009

(51) Int. Cl.
G06F 11/10  (2006.01)
G11C 29/00  (2006.01)

(52) U.S. Cl. .................... 714/773; 714/778; 714/805

(58) Field of Classification Search .............. 714/773, 714/778, 805
See application file for complete search history.

(56) References Cited

U.S. PATENT DOCUMENTS

| | | | | |
|---|---|---|---|---|
| 4,661,929 A * | 4/1987 | Aoki et al. | ............... | 365/149 |
| 4,701,884 A * | 10/1987 | Aoki et al. | ............... | 365/189.09 |
| 5,351,210 A * | 9/1994 | Saito | ............... | 365/189.14 |
| 5,450,363 A * | 9/1995 | Christopherson et al. | ............... | 341/98 |
| 5,864,569 A * | 1/1999 | Roohparvar | ............... | 714/773 |
| 5,892,710 A * | 4/1999 | Fazio et al. | ............... | 365/185.03 |
| 6,023,781 A * | 2/2000 | Hazama | ............... | 714/773 |
| 6,279,135 B1 * | 8/2001 | Nguyen et al. | ............... | 714/769 |
| 6,331,948 B2 * | 12/2001 | Kasai et al. | ............... | 365/185.09 |
| 6,646,913 B2 * | 11/2003 | Micheloni et al. | ............... | 365/185.03 |
| 6,674,385 B2 * | 1/2004 | Micheloni et al. | ............... | 341/155 |
| 6,901,011 B2 * | 5/2005 | Micheloni et al. | ............... | 365/185.22 |
| 7,239,556 B2 * | 7/2007 | Abe et al. | ............... | 365/185.33 |
| 7,305,596 B2 * | 12/2007 | Noda et al. | ............... | 714/718 |
| 7,330,370 B2 * | 2/2008 | Rinerson et al. | ............... | 365/158 |
| 7,333,364 B2 * | 2/2008 | Yu et al. | ............... | 365/185.09 |
| 7,450,425 B2 * | 11/2008 | Aritome | ............... | 365/185.19 |
| 7,511,646 B2 * | 3/2009 | Cornwell et al. | ............... | 341/126 |

(Continued)

FOREIGN PATENT DOCUMENTS

EP    0709776 A1    5/1996
(Continued)

OTHER PUBLICATIONS

International Search Report and Written Opinion dated Aug. 12, 2008 for International application No. PCT/EP2008/058426, pp. 1-11.

*Primary Examiner* — Stephen M Baker
(74) *Attorney, Agent, or Firm* — Ido Tuchman; Vazken Alexanian

(57) ABSTRACT

A method, system, and computer software product for operating a collection of memory cells. Memory cells are organized into a group of memory cells, with each memory cell storing a binary multi-bit value delimited by characteristic parameter bands. Two adjacent characteristic parameter bands are assigned binary multi-bit values that differ by only one bit. In one embodiment, an error correction unit calculates an actual parity check value of the retrieved binary multi-bit values for the group of memory cells. If the actual parity check value is not equal to the expected parity check value, the error correction unit assigns the error memory cell a corrected binary multi-bit value with the characteristic parameter value within the characteristic parameter band adjacent to the characteristic parameter band associated with the retrieved binary multi-bit value such that calculating a second actual parity check value correctly indicates the parity for the group of memory cells.

17 Claims, 7 Drawing Sheets

U.S. PATENT DOCUMENTS

| | | | |
|---|---|---|---|
| 7,551,482 B2 * | 6/2009 | Kamei et al. | 365/185.19 |
| 7,697,326 B2 * | 4/2010 | Sommer et al. | 365/185.03 |
| 7,747,903 B2 * | 6/2010 | Radke | 714/42 |
| 7,805,660 B2 * | 9/2010 | Hazama | 714/773 |
| 7,876,621 B2 * | 1/2011 | Sharon et al. | 365/185.24 |
| 7,886,212 B2 * | 2/2011 | Lasser | 714/763 |
| 2007/0086239 A1 | 4/2007 | Litsyn et al. | 365/185.03 |
| 2010/0131826 A1 * | 5/2010 | Shalvi et al. | 714/763 |

FOREIGN PATENT DOCUMENTS

| | | |
|---|---|---|
| EP | 0 709 776 B1 | 2/2000 |
| JP | 11339496 | 12/1999 |
| JP | 2001332096 | 11/2001 |
| JP | 2007157239 | 6/2007 |

* cited by examiner

Fig. 4A

| | | | |
|---|---|---|---|
| 114 | Data Cell 1 | 0 0 1 | 402 |
| 114 | Data Cell 2 | 1 0 0 | |
| 114 | Data Cell 3 | 0 0 0 | |
| 114 | Data Cell 4 | 1 0 1 | |
| 114 | Data Cell 5 | 1 0 0 | |
| 114 | Data Cell 6 | 1 1 1 | |
| 114 | Data Cell 7 | 0 1 0 | |
| 114 | Data Cell 8 | 1 1 0 | |
| 116 | Parity Cell 1 | 1 1 1 | |
| 404 | Expected Parity Check Value | 0 0 0 | |

| | |
|---|---|
| Band 0 | 0 0 0 — 406 |
| Band 1 | 0 0 1 — 408 |
| Band 2 | 0 1 1 — 406 |
| Band 3 | 0 1 0 — 410 |
| Band 4 | 1 1 0 — 406 |
| Band 5 | 1 1 1 — 408 |
| Band 6 | 1 0 1 — 406 |
| Band 7 | 1 0 0 |

Fig. 4C

412 — Actual Parity Check

| Actual Parity Check | | |
|---|---|---|
| 0 0 0 | No Errors | 414 |
| 0 0 1 | 1 Error | |
| 0 1 0 | 1 Error | 416 |
| 1 0 0 | 1 Error | |
| 0 1 1 | 2 Errors | |
| 1 0 1 | 2 Errors | 418 |
| 1 1 0 | 2 Errors | |
| 1 1 1 | 3 Errors | 420 |

| | 112 | 502 | 504 |
|---|---|---|---|
| 114 | Data Cell 1 | 0 0 1 | 0.490 |
| 114 | Data Cell 2 | 1 0 1 | 0.047 |
| 114 | Data Cell 3 | 0 0 0 | 0.974 |
| 114 | Data Cell 4 | 1 0 1 | 0.599 |
| 114 | Data Cell 5 | 1 0 0 | 0.455 |
| 114 | Data Cell 6 | 1 1 1 | 0.561 |
| 114 | Data Cell 7 | 0 1 0 | 0.878 |
| 114 | Data Cell 8 | 1 1 0 | 0.792 |
| 116 | Parity Cell | 1 1 1 | 0.924 |
| 412 | Actual Parity Check Value | 0 0 1 | |

Fig. 5

MULTI-BIT ERROR CORRECTION SCHEME IN MULTI-LEVEL MEMORY STORAGE SYSTEM

CROSS-REFERENCE TO RELATED APPLICATIONS

This application contains subject matter which is related to the subject matter of the following co-pending application, which is assigned to the same assignee as this application, International Business Machines Corporation of Armonk, N.Y. The below listed application is hereby incorporated herein by reference in its entirety:

U.S. patent application Ser. No. 11/620,704 filed Jan. 7, 2007, titled "MAXIMUM LIKELIHOOD STATISTICAL METHOD OF OPERATIONS FOR MULTI-BIT SEMICONDUCTOR MEMORY".

BACKGROUND OF THE INVENTION

1. Field of the Invention

The present invention relates to operation of memory storage systems, and more particularly to error detection and correction in memory storage systems using statistical methods, parity checks, and binary assignment schemes in high density storage systems.

2. Description of Background

Typical semiconductor computer memories are fabricated on semiconductor substrates consisting of arrays of large number of physical memory cells. In general, one bit of binary data is represented as a variation of a physical parameter associated with a memory cell. Commonly used physical parameters include threshold voltage variation of the Metal Oxide Field Effect Transistor (MOSFET) due to the amount of charge stored in a floating gate or a trap layer in non-volatile Electrically Erasable Programmable Read Only Memory (EEPROM), resistance variation of the Phase Change memory element in Phase-change Random Access Memory (PRAM) or Ovonic Unified Memory (OUM), and charge storage variation in volatile Dynamic Random Access Memory (DRAM).

Increasing the number of bits to be stored in a single physical semiconductor memory cell is an effective method to lower the manufacturing cost per bit. Multiple bits of data can also be stored in a single memory cell when variations of the physical parameter can be associated with multiple bit values. This multiple bits storage memory cell is commonly known as Multi-Level Cell (MLC). Significant amount of efforts in computer memory device and circuit designs are devoted to maximize the number of bits to be stored in a single physical memory cell. This is particularly true with storage class memory such as popular non-volatile Flash memories commonly used as mass storage device.

The basic requirement for multiple bit storage in a semiconductor memory cell is to have the spectrum of the physical parameter variation to accommodate multiple non-overlapping bands of values. The number of bands required for an n-bit cell is $2^n$. A 2-bit cell needs 4 bands, a 3-bit cell needs 8 bands and so forth. Thus, the available spectrum of a physical parameter in a semiconductor memory cell is the limiting factor for multiple bit memory storage.

In addition to the limiting spectrum width, fluctuations in environmental variables such as temperature, power, and time affect all operations and data integrity of a typical semiconductor storage device. Data integrity is a major problem for data storage systems due to the fluctuations in the environment variables. It is desirable to devise a cost effective method to preserve the integrity of the stored data in semiconductor storage systems.

SUMMARY OF THE INVENTION

An exemplary embodiment of the present invention is a method for operating a memory cell collection. The memory cell collection contains a plurality of memory cells organized into groups of memory cells associated with at least one parity cell per group of memory cells. Each of the memory cells in the group of memory cells stores a binary multi-bit value delimited by characteristic parameter bands of a characteristic parameter where adjacent characteristic parameter bands have assigned binary multi-bit values that differ by only one bit. The parity cells store multi-bit parity values. Additionally, the characteristic parameter shifts over time.

The method for memory controller operation entails dividing a characteristic parameter in the collection of memory cells into a plurality of characteristic parameter bands. A binary multi-bit value is assigned to each of the characteristic parameter bands such that two adjacent characteristic parameter bands have assigned binary multi-bit values that differ by only one bit. An associating operation associates a group of memory cells in the collection of memory cells to at least one parity cell. The parity cell stores a multi-bit parity value, and the multi-bit parity value indicates for the group of memory cells whether the number of occurrences of binary "true" values in each bit position of stored binary multi-bit values is odd or even so that each bit position in the group of memory cells and the parity cell has an expected parity check value.

A converting operation converts the binary multi-bit values and the multi-bit parity value to characteristic parameter values. The characteristic parameter values are in the characteristic parameter band associated with the assigned binary multi-bit values corresponding to the binary multi-bit values. A storing operation stores the binary multi-bit values and the multi-bit parity value in the group of memory cells and the parity cell.

At a later time, a retrieving operation retrieves the stored characteristic parameter values from the group of memory cells and the parity cell. A converting operation converts the stored characteristic parameter values to retrieved binary multi-bit values according to the assigned binary multi-bit values. A calculating operation calculates an actual parity check value. The actual parity check value indicates for the group of memory cells whether the number of occurrences of binary "true" values in each bit position of the retrieved binary multi-bit values is odd or even.

If the actual parity check value is not equal to the expected parity check value, the method further includes a calculating operation, an identifying operation and an assigning operation. The calculating operation calculates, for each memory cell in the group of memory cells and the parity cell, a band probability that the stored characteristic parameter value belongs to the characteristic parameter band assigned to the binary multi-bit value. The identifying operation identifies at least one error memory cell with a low band probability. The error memory cell corresponds to at least one of the memory cells in the group of memory cells and the parity cell. The assigning operation assigns the error memory cell a corrected binary multi-bit value with the characteristic parameter value within the characteristic parameter band adjacent to the characteristic parameter band associated with the retrieved binary multi-bit value such that a second actual parity check value correctly indicates for the group of memory cells whether the number of occurrences of binary "true" values in each bit position of the retrieved and corrected binary multi-bit values is odd or even.

Another exemplary embodiment of the invention is a memory device. The memory device includes at least one memory cell collection containing a plurality of memory cells. The plurality of memory cells are organized into groups of memory cells. Each memory cell in the group is configured to store a binary multi-bit value delimited by characteristic parameter bands of a characteristic parameter where adjacent characteristic parameter bands have assigned binary multi-bit values that differ by only one bit. At least one parity cell is associated with the group of memory cells. The parity cell is configured to store a multi-bit parity value, and the multi-bit parity value indicates for the group of memory cells whether the number of occurrences of binary "true" values in each bit position of the stored binary multi-bit values is odd or even so that each bit position in the group of memory cells and the parity cell has an expected parity check value.

A receiving unit in the memory device is configured to receive stored characteristic parameter values for each memory cell in the group of memory cells and the parity cell. A sensing unit is configured to sense shifted values in the characteristic parameter for each memory cell in the memory cell collection. A generating unit is configured to generate a probability distribution function of the characteristic parameter values for each of the stored binary multi-bit values from the shifted values of the characteristic parameter for each memory cell in the memory cell collection. A probability determining unit is configured to determine a band probability that the stored characteristic parameter values from the group of memory cells and the parity cell are within the probability distribution function for the stored binary multi-bit values. A converting unit is configured to convert the stored characteristic parameter values from the group of memory cells and the parity cell into the retrieved binary multi-bit values for which the probability is highest. An error correction unit is configured to calculate an actual parity check value. The actual parity check value indicates for the group of memory cells whether the number of occurrences of binary "true" values in each bit position of the retrieved binary multi-bit values is odd or even. If the actual parity check value is not equal to the expected parity check value, the error correction unit is configured to receive the band probability that the stored characteristic parameter value belongs to the characteristic parameter band assigned to the binary multi-bit value. Furthermore, the error correction unit is configured to identify at least one error memory cell with a low band probability. The error memory cell corresponds to at least one of the memory cells in the group of memory cells and the parity cell. The error correction unit is also configured to assign the error memory cell a corrected binary multi-bit value with the characteristic parameter value within the characteristic parameter band adjacent to the characteristic parameter band associated with the retrieved binary multi-bit value such that calculating a second actual parity check value correctly indicates for the group of memory cells whether the number of occurrences of binary "true" values in each bit position of the retrieved and corrected binary multi-bit values is odd or even.

Yet another exemplary embodiment of the invention is a computer program comprising a tangible computer readable medium embodying computer program code for operating a memory cell collection containing a plurality of memory cells. The plurality of memory cells are organized into groups of memory cells. Each group of memory cells is associated to at least one parity cell. Each memory cell in the group of memory cells is configured to store binary multi-bit values delimited by characteristic parameter bands of a characteristic parameter such that adjacent characteristic parameter bands have assigned binary multi-bit values differing by only one bit. The parity cell is configured to store a multi-bit parity value, the multi-bit parity value indicating for the group of memory cells whether the number of occurrences of binary "true" values in each bit position of the stored binary multi-bit values is odd or even so that each bit position in the group of memory cells and the parity cell has an expected parity check value.

The computer program contains computer executable instructions configured to receive stored characteristic parameter values from the group of memory cells and from the associated parity cell. The computer executable instructions are configured to convert the stored characteristic parameter values to retrieved binary multi-bit values according to the assigned binary multi-bit values. The computer executable instructions are also configured to calculate an actual parity check value. The actual parity check value indicates for the group of memory cells whether the number of occurrences of binary "true" values in each bit position of the retrieved binary multi-bit values is odd or even. If the actual parity check value is not equal to the expected parity check value, the computer executable instructions are further configured to calculate a band probability that the stored characteristic parameter value belongs to the characteristic parameter band assigned to the binary multi-bit value. The computer executable instructions are also configured to identify at least one error memory cell with a low band probability. The error memory cell corresponds to at least one memory cell in the group of memory cells or the parity cell. Furthermore, the computer executable instructions are configured to assign the error memory cell a corrected binary multi-bit value with the characteristic parameter value within the characteristic parameter band adjacent to the characteristic parameter band associated with the retrieved binary multi-bit value such that calculating a second actual parity check value correctly indicates for the group of memory cells whether the number of occurrences of binary "true" values in each bit position of the retrieved and corrected binary multi-bit values is odd or even.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIGS. 4A, 4B, and 4C illustrate parity check operation, binary value assignment to bands, and error indication via parity checks in accordance with one embodiment of the present invention.

FIG. 5 illustrates error detection operations in accordance with one embodiment of the present invention.

Figure 1:
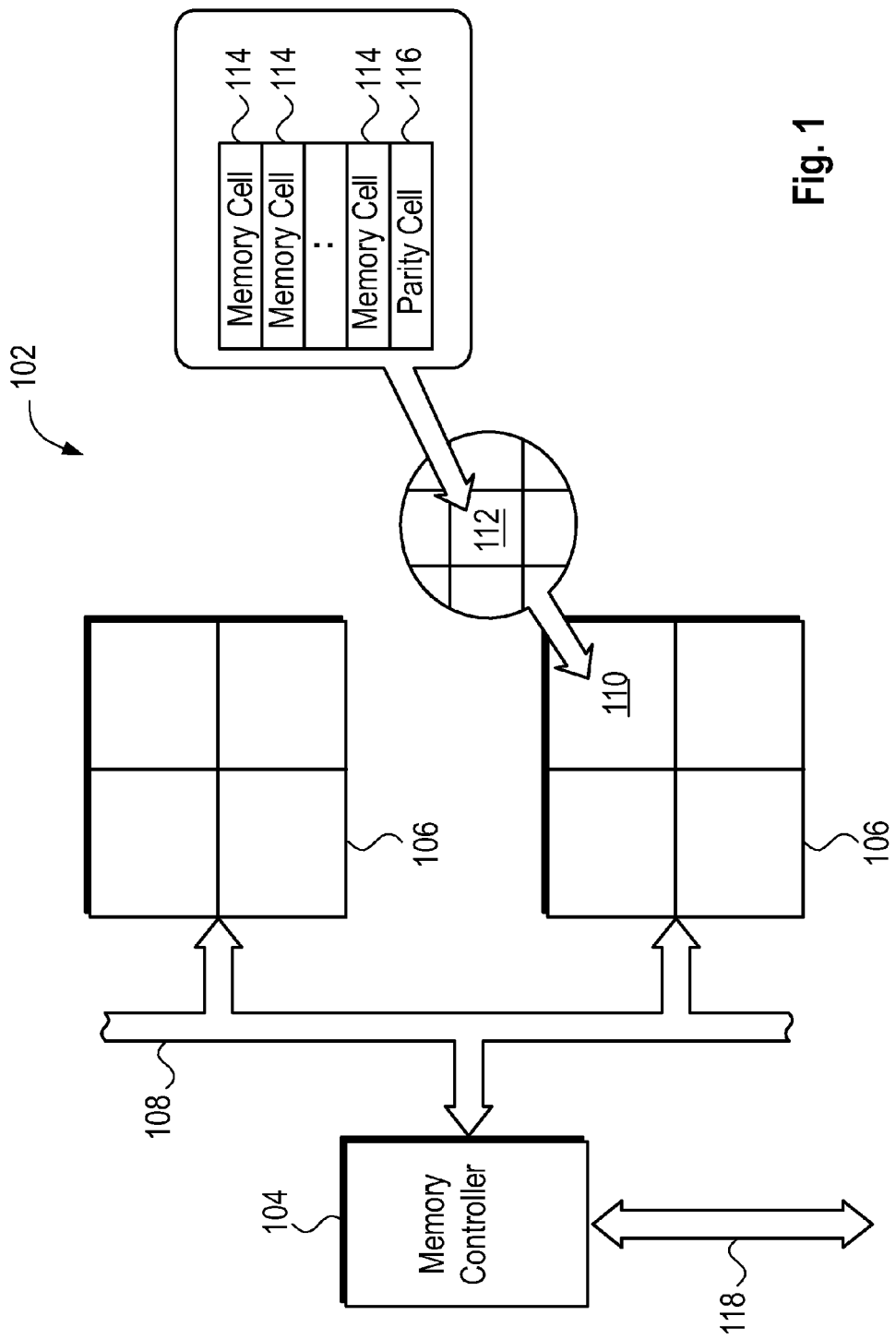
FIG. 1 illustrates a particular embodiment of a memory system in accordance with the present invention.

The detailed description explains the preferred embodiments of the invention, together with advantages and features, by way of example with reference to the drawings.

DETAILED DESCRIPTION OF THE INVENTION

The present invention will be described with reference to FIG. 1-7. When referring to the figures, like elements shown throughout are indicated with like reference numerals.

FIG. 1 illustrates an exemplary embodiment for a memory system 102 according to one embodiment of the present invention. The system includes a memory controller 104 coupled to one or more memory units 106 via a memory bus 108.

The memory units 106 may be individually packaged memory chips or the memory units 106 may exist in a single package multiplexed together. Furthermore, the memory controller 104 may be separately packed or incorporated with the memory units 106.

The memory units 106 are not limited to a particular memory storage technology. Those skilled in the art will recognize that different memory technologies use different characteristic parameters to store data. For example, Random Access Memory (DRAM) technology uses charge storage variation as a characteristic parameter to retain binary data. Phase Change Memory (PCM) and Resistive Random Access Memory (RRAM) technology use resistance variation as a characteristic parameter to store binary data. The memory cell system 102 only needs to be bound to a common characteristic parameter for all memory cells 114.

As shown, each memory unit 106 is divided into a plurality of memory cell collections 110. Each memory cell collection 110 is comprised of multiple groups of memory cells 112. Each group of memory cells 112 contains a plurality of memory cells 114 and at least one parity cell 116. Moreover, each individual memory cell 114 and parity cell 116 contains at least one possible binary value by associating the binary values with a characteristic parameter band in the memory cell. The characteristic parameter bands are delimited by preset value ranges of a characteristic parameter during a store operation to be further described in FIG. 2. In an embodiment of the present error detection and correction scheme, the memory cells 114 within a memory cell collection 110 are physically located in proximity with each other, are written and read at about the same time, and therefore undergo similar characteristic parameter perturbation and deterioration.

In one embodiment, the memory controller 104 receives a command and the corresponding data from the central processing unit (CPU) through an instruction/data bus 118 to program a memory cell collection 110. Upon receiving the data, the memory controller 104 sub-divides the data into groups, calculates and tags each group with at least one parity cell 116 before sending the data to the memory cell collection 110 to be programmed.

Advantages to incorporating a parity cell 116 into a group of memory cells 112 are apparent in data error correction schemes. The parity cell 116 data indicates whether the number of binary "true" values in a bit position is odd or even. This allows the memory cell system 102 to check the retrieved data for values that may have changed, as a result of environmental factors that will be discussed below, by comparing the retrieved odd or even number of binary "true" values in each bit column to a preset expected odd or even number of binary "true" values. If the values are not equal the memory cell system 102 may take corrective action.

Figure 2:
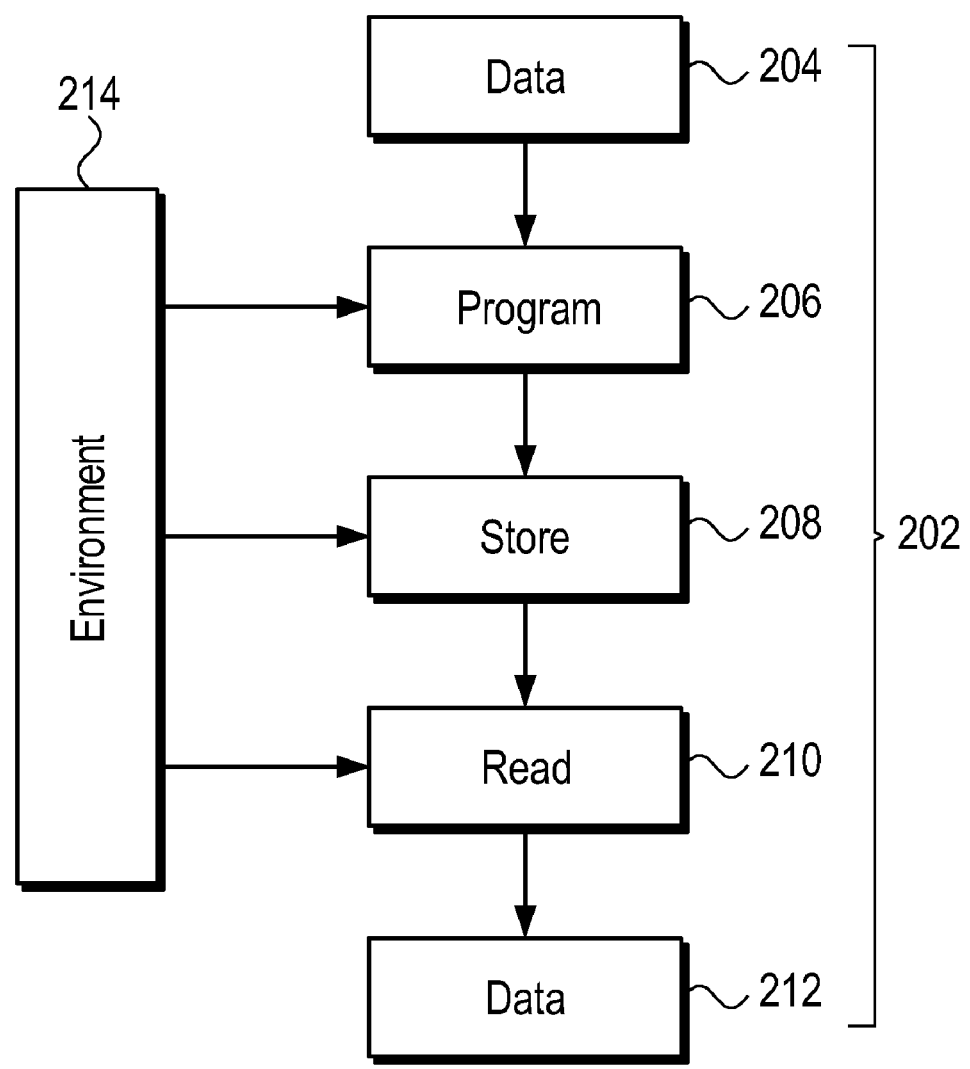
FIG. 2 illustrates the environmental effects on memory system operations.

Turning to FIG. 2, a memory cell operation procedure 202 according to the present invention is shown. At step 204, data to be stored is acquired. The data may come from various sources, such as a Central Processing Unit (CPU) or a peripheral device coupled to the memory unit containing the memory cell.

At programming operation 206, the acquired data is written into the memory cell. Depending on the storage technology used, writing data may consist of storing charge in a capacitor for charge storage, applying voltage to the source, drain, or control gate in a floating gate transistor for threshold voltage variation, melting and cooling the phase change material to change optical refractive index, or melting and cooling phase change material to change resistance. After the data is written into memory, it is stored for a period of time at storing operation 208.

At a later time after the storing operation 208, the data is retrieved from the memory cell during reading operation 210. The exact process for retrieving the data again depends on the technology used. For example, when reading DRAM memory, transistors are activated connecting the memory cell capacitors to sense lines. When reading a PCM memory cell, a current is passed through the cell's phase-change material. The data is finally retrieved at step 212.

The environment 214 (both internal and external to the memory cell) affects the programming 206, storing 208, and reading 210 operations of the memory cell operation procedure 202. Environmental factors such as, but not limited to, humidity, time, temperature, magnetic fields, and electrical fields may cause for example charge leakage in DRAM, threshold voltage shifts in EEPROM, optical refractive index variation in phase change material of optical memory, or change the resistance levels in PCM and RRAM. More generally, the characteristic parameter used to delineate binary values in the memory cell may shift over time due to environmental conditions. The environmental factors 214 cause data distortion so that the data extracted from the memory cell may not be the same as the data input to the memory cell. As discussed below, an embodiment of the present invention is an operating procedure that compensates for shifts in the characteristic parameter over time using error detection and correction methods with statistical operations and parity checks.

Figure 3:
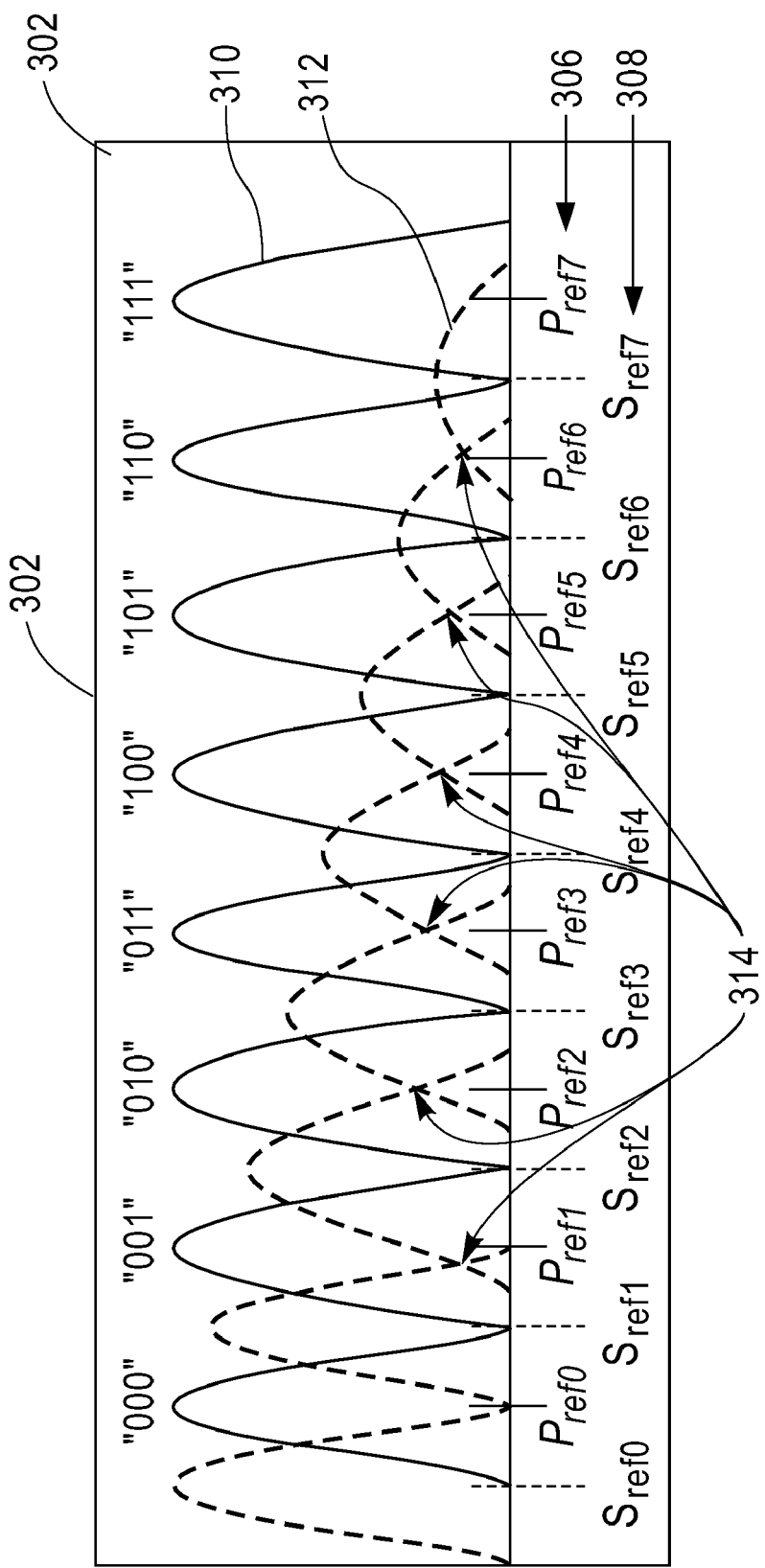
FIG. 3 illustrates a characteristic parameter distribution in an exemplary memory cell collection of the present invention.

FIG. 3 shows an assignment scheme for a memory cell collection distribution 302 with 3-bit binary values and shifts in characteristic parameter values within the memory cell collection. A characteristic parameter in each memory cell is divided into a plurality of characteristic parameter bands (also referred to as value ranges). Each initial characteristic parameter band 310 is associated with an assigned binary multi-bit value 304, where two adjacent initial characteristic parameter bands 310 have assigned binary multi-bit values 304 that differ by only one bit. Grey code is an example of an assignment scheme that could be implemented for this exemplary embodiment. Additionally, each initial characteristic parameter band 310 is centered on a preset characteristic parameter reference value 306 (e.g., designated as parameters $P_{ref0}$-$P_{ref7}$). When programming a memory cell, the characteristic parameter value for the memory cell is programmed to the preset characteristic parameter reference value 306.

Ideally, binary multi-bit values stored in the memory cell collection are represented by precise characteristic parameter values exactly equaling the preset characteristic parameter reference values 306. In practice, however, the characteristic parameter values form value ranges/bands (typically Gaussian distribution curves) centered about the preset characteristic parameter reference values 306. This is typically due to natural variations during memory cell manufacturing. Thus, the preset characteristic parameter reference values 306 ($P_{ref0}$-$P_{ref7}$) are mean values of the characteristic parameter when data is initially programmed in a memory cell collection. Furthermore, the characteristic parameter values shift as a result of environmental factors over time, as discussed above. Initial characteristic parameter bands 310 of each memory cell collection are uniform initially and centered on the preset characteristic parameter reference values $P_{ref0}$-$P_{ref7}$. Without loss of generality, the number of memory cells in each initial characteristic parameter band 310 is assumed to be the same here; however, in practice, the numbers of memory cells may vary.

FIG. 3 also illustrates the shifting of characteristic parameter values as a result of environmental factors in the form of the characteristic parameter value ranges/bands that the values form. As illustrated, shifted characteristic parameter bands 312 are no longer centered around the preset characteristic parameter reference values 306 but centered around shifted characteristic parameter reference values 308. The characteristic parameter values are shifted towards the left from the initial characteristic parameter bands 310 which represent a lower potential energy configuration of the memory cell parameter within the storage or operating environment. In general, the shift is more pronounced and the dispersion is wider farther away from the lowest potential energy configuration. For example, the characteristic parameter in FIG. 3 may represent the apparent threshold voltages of a memory cell collection of Flash EEPROM in which the apparent threshold voltage is an increasing function of the number of electrons stored in the floating gate, and the lowest potential energy configuration is no electron stored corresponding to lowest apparent threshold voltage.

The memory controller beneficially compensates for decays in characteristic parameter values by not only reading the characteristic parameter value of a target memory cell in the memory cell collection, but also of the characteristic parameter values of all the memory cells in the memory cell collection. In the data retrieval operation, the memory controller receives a high precision characteristic parameter value for each memory cell in the memory cell collection and fits the dispersed and shifted characteristic parameter bands with probable distribution curves by statistical methods.

The characteristic parameter value of a target memory cell is evaluated against the shifted characteristic parameter bands 312 constructed and the most likely binary value for the target memory cell is determined by choosing the band with the highest probability value. Any memory cell in the memory cell collection can be a target memory cell. In this manner, the binary values of all the memory cells in the memory cell collection can be retrieved. In one embodiment of the invention, the shifted characteristic parameter bands 312 of the memory cell collection are reconstructed each time the target memory cell or the group of memory cells or the entire memory cell collection is read. Memory cell data may be rewritten or restored after a threshold time interval and/or when a memory cell is programmed or reprogrammed.

In one embodiment, the characteristic parameter bands are created by a probability distribution function, $$P(x_1^k, \ldots, x_{n_k}^k \mid \mu_k, \sigma_k^2) = \left(\frac{1}{2\pi\sigma_k^2}\right)^{\frac{n_k}{2}} e^{-\frac{\sum_{i=1}^{n_k}(x_i^k - \bar{x}^k)^2 + n_k(\bar{x}^k - \mu_k)^2}{2\sigma_k^2}}$$

where $n_k$ is the number of memory cells with a characteristic parameter in the k th band, m is the number of bit storage values per memory cell, and $x^k$ is the value of the characteristic parameter value read from a memory cell pertaining to a specific band, not x to the k th power; so, $x_1^1$ would indicate the first characteristic parameter from the first characteristic parameter band in the memory cell collection 110. The number of bands (k) and the mean of the characteristic parameter values read ($\bar{x}^k$) are defined by, $$k = 1, \ldots, 2^m, \bar{x}^k = \frac{1}{n_k}\sum_{i=1}^{n_k} x_i^k.$$

Additionally, $\mu_k$ is the mean of the k th band, also used as the reference points $P_{ref}$ and $\sigma_k^2$ is the variance of the k th band.

A maximum likelihood estimator is given by, $$\hat{\theta}_k = (\hat{\mu}_k, \hat{\sigma}_k^2) = \left(\bar{x}^k, \sum_{i=1}^{n_k}(x_i^k - \bar{x}^k)^2 / n_k\right)$$

where $\hat{\mu}_k$ is the mean estimator of the k th band and $\hat{\sigma}_k^2$ is the variance estimator of the k th band. The maximum likelihood estimator is used to determine the band to which a particular value belongs, and in turn the binary data a memory cell stores, by using a least squares method. A sensed value from the memory cell is placed in each individual band of the memory cell collection and a probability is assigned to each band based on the value and its relation to the mean of the band.

A problem in constructing shifted distribution bands arises if each individual memory cell is programmed separately. The shifts of each characteristic parameter will vary since each memory cell may be exposed to environmental factors over different durations of time between programming. For example, in EEPROM, the electrons stored in the floating gate may leak over time and with heat. Memory cells programmed at differing times will have differing amounts of electron leakage depending on the how long they have been exposed to heat since their initial programming. Furthermore, the characteristic parameter bands will differ greatly from memory cell collection to memory cell collection.

If the cells are programmed all at the same time whether or not certain data needs to be changed creates a consistent data shift. This prevents the aforementioned problem with varying degrees of shift because electron leakage is consistent across a memory cell collection. New distribution bands can now be created with consistently shifted data using the probability distribution function and the maximum likelihood estimator.

Since time, heat, and other environmental factors shift characteristic parameter values and their bands, over a period of time the value ranges may shift enough so that they may become one continuous band. Referring to again FIG. 3, for example, the shifted characteristic parameter bands 312 corresponding to binary data "110" and "111" begin to overlap at point 314. A maximum likelihood estimator can be used to generate a good estimate for values located in an overlapping region, but as overlap increases the accuracy of the maximum likelihood estimator decreases. To help overcome this uncertainty in maximum likelihood estimation, an error correction scheme is utilized, as detailed below.

FIG. 4A illustrates an exemplary embodiment of the invention using 3-bit binary storage values for a group of eight memory cells 114. Sample data is included for demonstrative purposes. The three bit columns 402 illustrating bit position contain either a binary "true" value or a binary "false" value. The data bits of parity cell 116 associated with the group of memory cells 114 are obtained by evaluating each bit column 402 of the data bits comprising the memory cells 114 and the parity cell 116 to an even binary "true" value count. It should be noted that other parity schemes may be employed as well.

FIG. 4B illustrates a table for assigned binary multi-bit values associated with characteristic parameter bands in a 3-bit memory system. FIG. 4C shows the eight possible actual parity check values 412 for the exemplary 3-bit memory system. There are no detected errors when the actual parity check value 412 is evaluated to "000" 414 as shown in FIG. 4C.

Every binary "true" value evaluated in a bit position from the actual parity check value 412 results in an error corresponding to a characteristic parameter value shift between bands. Actual parity check values 412 with one binary "true" value such as "001", "010", and "100" indicate one bit errors 416 in the group of memory cells 112. An actual parity check value 412 of "001" is typically the result of four possible shifts in binary values, all occurring at the right most bit column 406 (least most significant bit). An actual parity check value 412 of "010" is typically a result of shifts in binary values, both occurring in the middle bit column 408. The last one bit error 416 is indicated by an actual parity check value 412 of "100" where there is a binary value shift occurring in the left most bit column 410.

Two bit errors 418 such as "011", "101", and "110", and a three bit error 420 indicated by an actual parity check value of "111" can also be identified and corrected as a combination of the one bit errors 416. For example, an actual parity check value 412 of "011" indicates an error in the middle bit column and right most bit column, so binary value shifts of 408 and 406 have occurred.

All detectable errors in this parity and assignment scheme can be corrected. However, an even number of errors in the same bit column will result in an undetectable error and therefore cannot be corrected. An example of this would be a shifted value between Band 1 and 0, and a shifted value between Band 3 and 2. Since both are right most bit column errors 406, the actual parity check 412 will result in a binary "false" value in the right most bit column causing no error detections.

By way of the following example, the error detection and correction scheme will be illustrated. Referring to the forementioned memory cell collection wherein each memory cell stores 3 bits of data, FIG. 5 depicts an example of binary data stored in a memory cell group of eight memory cells 114 along with a corresponding parity cell 116 coded to an even expected parity check value). During a subsequent read operation, the retrieved binary multi-bit values 502 of the group of memory cells 112 contain erroneous data. The actual parity check value 412 evaluated from the retrieved data is "001" which indicates an error has been detected (Data Cell 2 now reads "101" instead of "100" as in FIG. 4A). Along with the binary data retrieved from each memory cell 114 and the parity cell 116 in the group of memory cells 112, a band probability 504 indicating the likeliness that the data retrieved is stored in each memory cell during the programming operation. The band probability 504 for each memory cell is evaluated using statistical methods as discussed above. Comparing the band probabilities 504 of the group of memory cells 112, the retrieved data "101" for Data Cell 2 has the lowest probability of being correct in the memory cells group, thus is the most probable error memory cell.

Referring back to FIGS. 4B and 4C, the actual parity check value of "001" indicates a 416 error which only has four possible binary value shifts. Additionally, Data Cell 2 has a retrieved binary multi-bit value associated with Band 6. The only possible situation a Band 6 error can occur with an actual parity check value of "001" is when characteristic parameter values associated Band 7 has shifted far enough to the left to be erroneously identified as data associated with Band 6. Data Cell 2 is now reprogrammed with a new characteristic parameter value centered on the shifted characteristic parameter reference value 308 (FIG. 3).

The actual parity check value 506 should now be returned to even parity ("000") according to the expected parity check value 404. If the actual parity check value 506 does not indicate even parity then the error cannot be corrected and an error condition is indicated.

Figure 6:
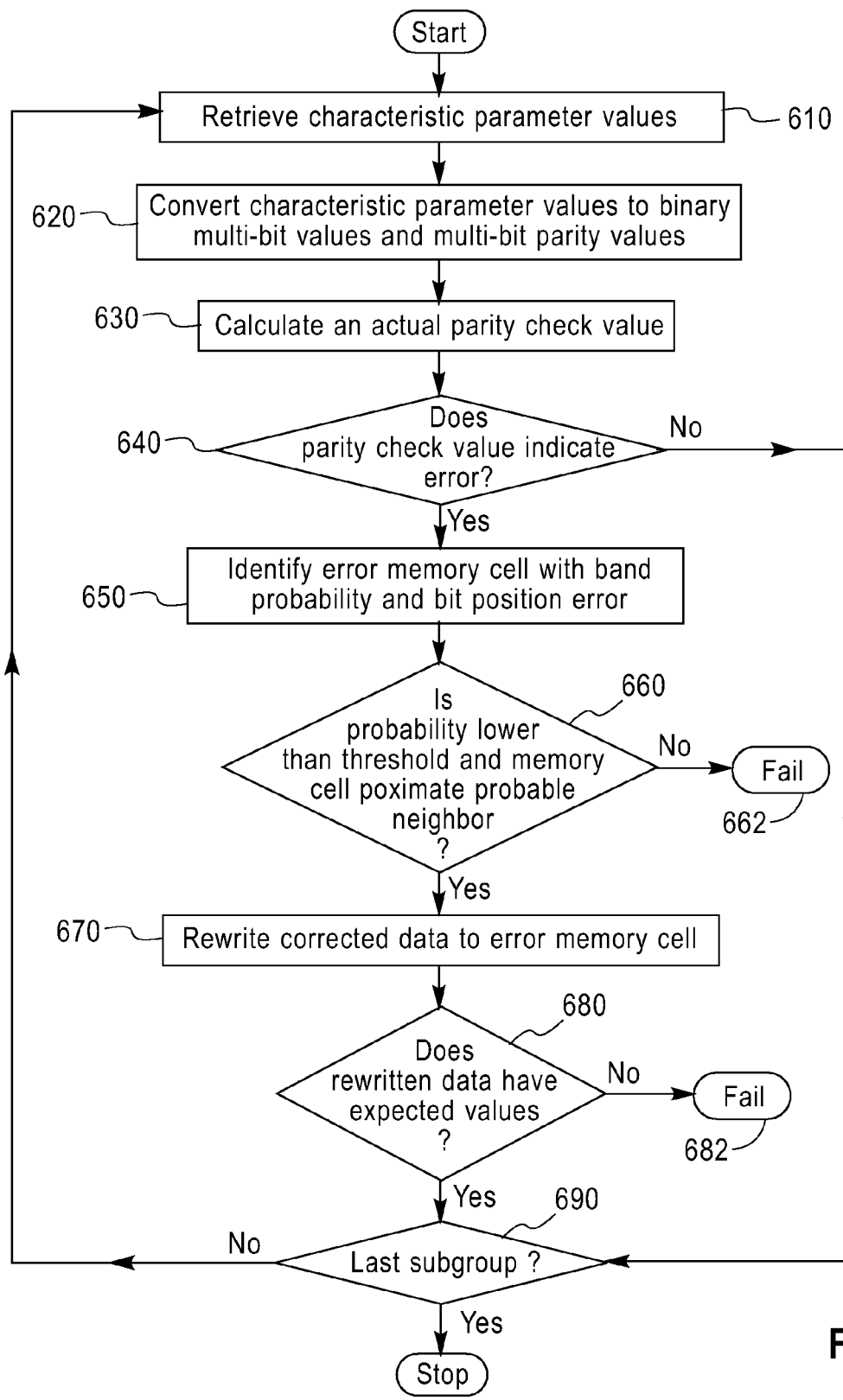
FIG. 6 illustrates error detection and correction operation flow according to one embodiment of the present invention.

Turning to FIG. 6, an error detection and correction flowchart in accordance with an embodiment of the present invention is shown. It will be understood that each block of the flowchart, and combinations of blocks in the flowchart, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device or a magnetic storage device.

As shown, process flow begins at retrieving operation 610. During retrieving operation 610, the characteristic parameter values storing binary multi-bit values and the multi-bit parity value are retrieved from the group of memory cells. As mentioned above, the present invention is not limited to a particular memory storage technology and various characteristic parameters may be used to store data in accordance with the invention. In one embodiment of the invention, an analog sense amplifier and analog-to-digital converter circuit perform the retrieving operation 610. After the retrieving operation 610 is completed, control passes to converting operation 620.

At converting operation 620, the stored characteristic parameter values are converted to binary multi-bit values and one or more multi-bit parity values. Various binary encoding schemes known in the art may be used to convert the characteristic parameter values to binary multi-bit values, such as Grey code.

In a particular embodiment of the invention, converting the characteristic parameter values to multi-bit data values and multi-bit parity values includes sensing shifted values of the characteristic parameter for each memory cell in the collection of memory cells. A probability distribution function is then generated for each of the possible binary multi-bit values from the shifted values of the characteristic parameter for each memory cell. A probability that the stored characteristic parameter values from the group of memory cells and the parity cell are within the probability distribution function is determined for each of the possible binary multi-bit values. Furthermore, the stored characteristic parameter values from the group of memory cells and the parity cell are converted into retrieved binary multi-bit values and a multi-bit parity value for which the probability is highest. After converting operation 620 is completed, process flow passes to calculating operation 630.

At calculating operation 630, the multi-bit data values are examined and an actual parity check value is calculated. The actual parity check value, like the retrieved parity check value indicates whether the number of occurrences of binary "true" values in each bit position of the retrieved binary multi-bit values is odd or even. After calculating operation 630 is completed, control passes to determining operation 640.

At determining operation 640, the actual parity check value is compared against the expected parity check value retrieved from the parity cell. If the actual parity check value is equal to the expected parity check value, this indicates the retrieved binary multi-bit values do not contain errors and process flow moves to determining operation 690. If, however, there is a discrepancy between the actual parity check value and the expected parity check value, control passes to identifying operation 650.

At the identifying operation 650, a band probability that the stored characteristic parameter value belongs to the characteristic parameter band assigned to the binary multi-bit value is calculated for each memory cell in the group of memory cells and the parity cell. The band probability for each memory cell is evaluated using statistical methods as discussed above. The identifying operation 650 further identifies at least one error memory cell having a low band probability belonging to the group of memory cells and/or the parity cell. In a particular embodiment of the invention, the band probability of the error memory cell is compared against a probability threshold value such that a memory cell having the band probability above the probability threshold value is not considered an error memory cell. After the identifying operation 650 is completed, control passes to comparing operation 660.

At comparing operation 660, the band probability of the error memory cell is compared against a probability threshold value. If the band probability of the error memory cell is not lower than a threshold value, an error indication is sent at error operation 662. Comparing operation 660 also looks for a closest or proximate neighboring band which is the most probable neighboring band to which the error memory cell would belong. In particular, the operation checks if there is a multi-bit binary value in a band adjacent to the current characteristic parameter band of the error memory cell that would correct the actual parity check value. If the error memory cell does not have a likely proximate neighboring band to which it belongs then the step fails to error operation 662. If the band probability of the error memory cell meets the threshold and the error memory cell has a likely proximate neighboring band to which it belongs, control passes to rewriting operation 670.

At rewriting operation 670, the corrected data is rewritten to the error memory cell. During this step, the error memory cell is assigned a corrected binary multi-bit value with the characteristic parameter value within the characteristic parameter band adjacent to the characteristic parameter band associated with the retrieved binary multi-bit value such that a second actual parity check value correctly indicates for the group of memory cells whether the number of occurrences of binary "true" values in each bit position of the retrieved and corrected binary multi-bit values is odd or even. After rewriting operation 670 is completed, control passes to determining operation 680.

At determining operation 680, the results from a second parity check using the second actual parity check value are examined. If the second actual parity check value does not correctly indicate for the group of memory cells whether the number of occurrences of binary "true" values in each bit position of the retrieved and corrected binary multi-bit values is odd or even, according to the expected parity check value, an error indication is transmitted at error operation 682. If the second parity check values correctly indicate the parity for the group of memory cells, control passes to determining operation 690.

At determining operation 690, a determination is made as to whether there are additional groups of memory cells in the memory cell collection that require error detection and correction. If there are more groups of memory cells that require error detection and correction in the memory cell collection then the system moves to the next group of memory cells and the control flow passes back to retrieving operation 610. If the group of memory cells in the memory cell collection is the last or only group of memory cells that requires error detection and correction the process ends.

Figure 7:
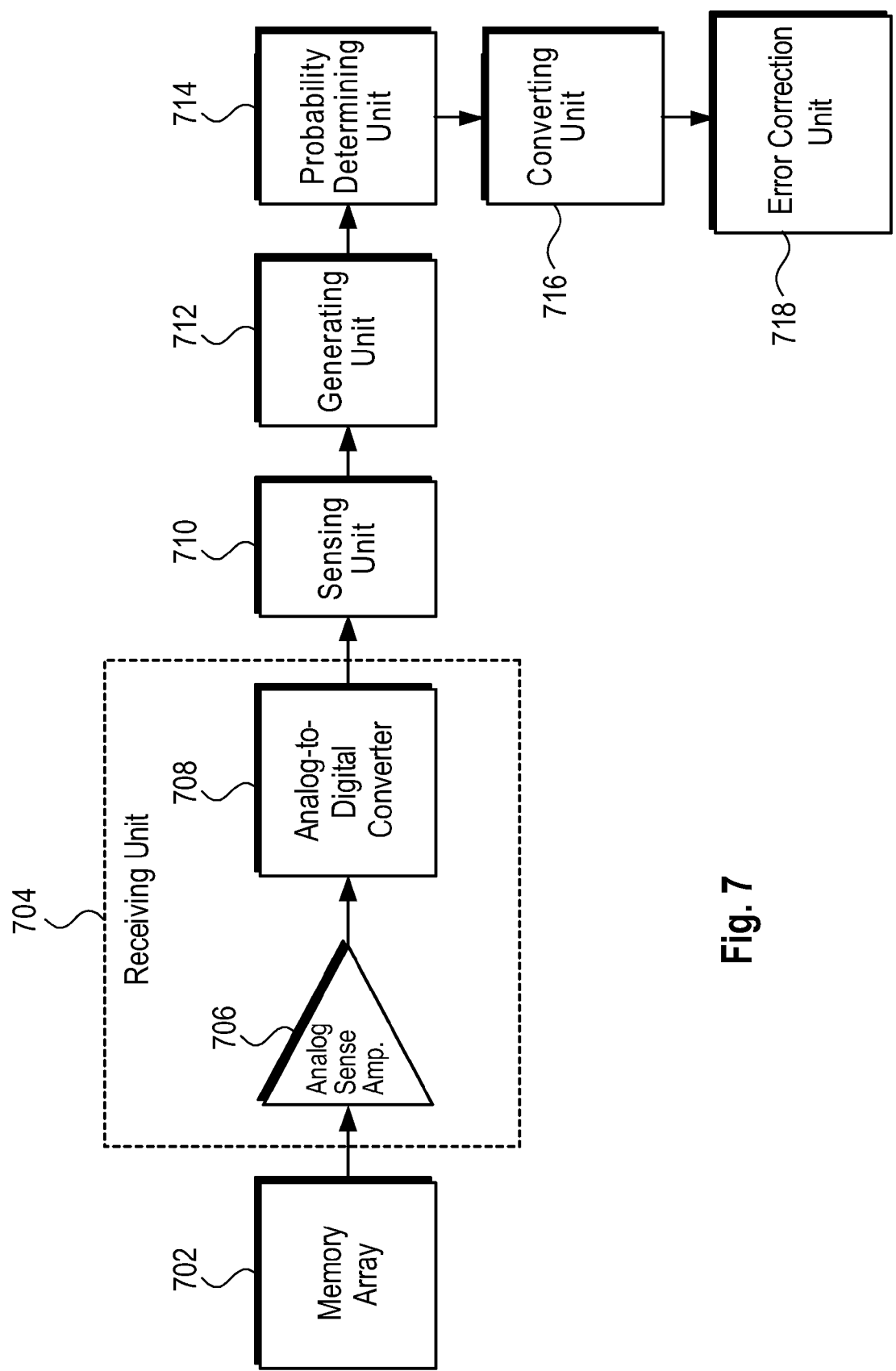
FIG. 7 illustrates an error detection and correction memory device according to one embodiment of the present invention.

Referring to FIG. 7, in one illustrative embodiment, the memory controller includes a receiving unit 704, a sensing unit 710, a generating unit 712, a probability determining unit 714, a converting unit 716, and an error correction unit 718.

The receiving unit 704 receives the values of the characteristic parameter for each memory cell in a memory array 702. The memory cells examined by the receiving unit 704 may, for example, be addressed using a block address input to the memory array 702. More specifically, data is accessed by locating the block address of a memory array 702 including the data desired. The raw data is read as an analog signal by an analog sense amplifier 710. The analog sense amplifier 706 amplifies the signal and sends the signal to an analog-to-digital converter 708. The analog-to-digital converter 708 converts the analog signal to digital data that can be read and processed by the sensing unit 710. In one embodiment, the resolution of the analog-to-digital converter 708 is a multiple of the number of bits stored in each memory cell. For example, the resolution of the analog-to-digital converter 708 may have a resolution three times the number of bits stored per memory cell. For a memory cell storing two bits, the resolution would therefore equal six bits.

The sensing unit 710 receives the digital data from the receiving unit 704 and senses the shifted values in the characteristic parameter for each of the memory cells in the memory block. As mentioned above, the characteristic parameter values may shift due to a number of factors, such as, but not limited to, humidity, time, temperature, magnetic fields, and electrical fields.

The generating unit 712 receives the shifted characteristic parameter values and generates the probability distribution function of the characteristic parameter values for each of the stored binary multi-bit values from the memory block. Additionally, the generating unit 712 creates the normal distribution curves for the memory block with the probability distribution function. The mean and variance of these distribution curves/bands are also calculated by the generating unit 712.

The probability determining unit 714 determines a band probability that the stored characteristic parameter values from the memory block are within the probability distribution function for each of the stored binary multi-bit values. The band probabilities are derived from the probability determining unit 714.

The converting unit 716 converts the value of the characteristic parameter for the target memory cells into the binary multi-bit values for which the probability is highest.

An error correction unit 718 identifies error cells by performing a parity check on the binary data received from the converting unit 716. The band probability is assigned to each memory cell from the probability determining unit 714, by the processes described above. The error correction unit 718 uses the bit position of the error in the parity check and the band probability in conjunction to identify and correct the error memory cell. In one embodiment of the system, if the band probability for the error memory cell from the probability determining unit 714 is below a threshold value then an error indication is transmitted by the error correction unit 718. If an additional parity check does not result in an expected parity check value after the corrected data has been written to the error memory cell then an error indication is transmitted by the error correction unit 718.

The aforementioned method for operating a memory cell system is compatible with both structural devices programmed and configured for the method and computer software written with computer executable instructions configured for the method.

Having described preferred embodiments for multi-level memory error detection and correction systems and methods (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for operating a collection of memory cells storing binary data, the method comprising:

dividing a characteristic parameter in the collection of memory cells into a plurality of characteristic parameter bands;

assigning a binary multi-bit value to each of the plurality of characteristic parameter bands such that adjacent characteristic parameter bands have assigned binary multi-bit values differing by only one bit;

associating a group of memory cells in the collection of memory cells to at least one parity cell, the parity cell storing a multi-bit parity value, the multi-bit parity value indicating for the group of memory cells whether the number of occurrences of binary "true" values in each bit position of stored binary multi-bit values is odd or even so that each bit position in the group of memory cells and the parity cell has an expected parity check value;

converting the binary multi-bit values and the multi-bit parity value to characteristic parameter values, the characteristic parameter values being in the characteristic parameter band associated with the assigned binary multi-bit value corresponding to the binary multi-bit value;

storing the binary multi-bit values and the multi-bit parity value in the group of memory cells and the parity cell;

retrieving the stored characteristic parameter values from the group of memory cells and the parity cell;

converting the stored characteristic parameter values to retrieved binary multi-bit values according to the assigned binary multi-bit values;

calculating an actual parity check value, the actual parity check value indicating for the group of memory cells whether the number of occurrences of binary "true" values in each bit position of the retrieved binary multi-bit values is odd or even; and if the actual parity check value is not equal to the expected parity check value, the method further comprising:

a) for each memory cell in the group of memory cells and the parity cell, calculating a band probability that the stored characteristic parameter value belongs to the characteristic parameter band assigned to the binary multi-bit value;

b) identifying at least one error memory cell having a low band probability, the at least one error memory cell corresponding to at least one of the memory cells in the group of memory cells and the parity cell; and c) assigning the error memory cell a corrected binary multi-bit value with the characteristic parameter value within the characteristic parameter band adjacent to the characteristic parameter band associated with the retrieved binary multi-bit value such that a second actual parity check value correctly indicates for the group of memory cells whether the number of occurrences of binary "true" values in each bit position of the retrieved and corrected binary multi-bit values is odd or even.

2. The method of claim 1, wherein converting the stored characteristic parameter values to the retrieved binary multi-bit values includes:

sensing shifted values of the characteristic parameter for each of the memory cells in the memory cell collection;

generating a probability distribution function of the characteristic parameter values for each of the possible binary multi-bit values from the shifted values of the characteristic parameter for each of the memory cells in the memory cell collection;

determining a probability that the stored characteristic parameter values from the group of memory cells and the parity cell are within the probability distribution function for each of the possible binary multi-bit values; and converting the stored characteristic parameter values from the group of memory cells and the parity cell into the retrieved binary multi-bit values and the multi-bit parity values for which the probability is highest.

3. The method of claim 1, further comprising transmitting an error indication if no error memory cell is identified having the corrected binary multi-bit value associated with the characteristic parameter band adjacent to the characteristic parameter band associated with the retrieved binary multi-bit value such that calculating a second actual parity check value correctly indicates for the group of memory cells whether the number of occurrences of binary "true" values in each bit position of the retrieved and corrected binary multi-bit values is odd or even.

4. The method of claim 1, further comprising transmitting an error indication if the band probability of the error memory cell is above a maximum probability value.

5. The method of claim 1, wherein identifying the at least one error memory cell includes comparing the band probability to a probability threshold value such that a memory cell having the band probability above the probability threshold value is not the error memory cell.

6. The method of claim 1, wherein assigning the memory cell the corrected binary multi-bit value comprises storing the corrected binary multi-bit value in the memory cell corresponding to the error memory cell.

7. A memory device, comprising:
   memory cells organized into a group of memory cells, each memory cell in the group is configured to store a binary multi-bit value delimited by characteristic parameter bands of a characteristic parameter such that adjacent characteristic parameter bands have assigned binary multi-bit values differing by only one bit;
   at least one parity cell associated with the group of memory cells, the parity cell is configured to store a multi-bit parity value, the multi-bit parity value indicating for the group of memory cells whether the number of occurrences of binary "true" values in each bit position of the stored binary multi-bit values is odd or even where an expected parity check value is calculated in each bit position;
   a receiving unit for receiving stored characteristic parameter values for each memory cell in the group of memory cells and the parity cell;
   a sensing unit for sensing shifted values in the characteristic parameter for each memory cell in the memory cell collection;
   a generating unit for generating a probability distribution function of the characteristic parameter values for each of the stored binary multi-bit values from the shifted values of the characteristic parameter for each memory cell in the memory cell collection;
   a probability determining unit for determining a band probability that the stored characteristic parameter values from the group of memory cells and the parity cell are within the probability distribution function for each of the stored binary multi-bit values;
   a converting unit for converting the stored characteristic parameter values from the group of memory cells and the parity cell into the retrieved binary multi-bit values for which the probability is highest; and
   an error correction unit for calculating an actual parity check value, the actual parity check value indicating for the group of memory cells whether the number of occurrences of binary "true" values in each bit position of the retrieved binary multi-bit values is odd or even, if the actual parity check value is not equal to the expected parity check value, the error correction unit is configured to:
   a) receive the band probability that the stored characteristic parameter value belongs to the characteristic parameter band assigned to the binary multi-bit value;
   b) identify at least one error memory cell having a low band probability, the at least one error memory cell corresponding to at least one of the memory cells in the group of memory cells and the parity cell; and
   c) assign the error memory cell a corrected binary multi-bit value with the characteristic parameter value within the characteristic parameter band adjacent to the characteristic parameter band associated with the retrieved binary multi-bit value such that calculating a second actual parity check value correctly indicates for the group of memory cells whether the number of occurrences of binary "true" values in each bit position of the retrieved and corrected binary multi-bit values is odd or even.

8. The memory device of claim 7, wherein the error correction unit is further configured to transmit an error indication if no error memory cell is identified having the corrected binary multi-bit value associated with the characteristic parameter band adjacent to the characteristic parameter band with the retrieved binary multi-bit value such that the second actual parity check correctly indicates for the group of memory cells the number of occurrences of binary "true" values in each bit position of the retrieved and corrected binary multi-bit values is odd or even.

9. The memory device of claim 7, wherein the error correction unit is further configured to transmit an error indication if the band probability of the error memory cell is above a maximum probability value.

10. The memory device of claim 7, wherein the error correction unit is further configured to compare the band probability to a probability threshold value such that a memory cell having the band probability above the probability threshold value is not the error memory cell.

11. The memory device of claim 7, wherein the error correction unit is further configured to store the corrected binary multi-bit in the memory cell corresponding to the error memory cell.

12. A computer program product comprising a tangible computer readable medium embodying computer program code for operating at least one group of memory cells associated to at least one parity cell, the memory cells in the group of memory cells storing binary multi-bit values delimited by characteristic parameter bands of a characteristic parameter such that adjacent characteristic parameter bands have assigned binary multi-bit values differing by only one bit, the parity cell storing a multi-bit parity value, the multi-bit parity value indicating for the group of memory cells whether the number of occurrences of binary "true" values in each bit position of the stored binary multi-bit values is odd or even where an expected parity check value is calculated, the computer program code comprising computer executable instructions for:
   receiving stored characteristic parameter values from the group of memory cells and from the associated parity cell;
   converting the stored characteristic parameter values to retrieved binary multi-bit values according to the assigned binary multi-bit values;
   calculating an actual parity check value, the actual parity check value indicating for the group of memory cells whether the number of occurrences of binary "true"

values in each bit position of the retrieved binary multi-bit values is odd or even; and if the actual parity check value is not equal to the expected parity check value, the computer executable instructions are configured to:
- a) calculate a band probability that the stored characteristic parameter value belongs to the characteristic parameter band assigned to the binary multi-bit value;
- b) identify at least one error memory cell having a low band probability, the at least one error memory cell corresponding to at least one memory cell in the group of memory cells and the parity cell; and
- c) assign the error memory cell a corrected binary multi-bit value with the characteristic parameter value within the characteristic parameter band adjacent to the characteristic parameter band associated with the retrieved binary multi-bit value such that calculating a second actual parity check value correctly indicates for the group of memory cells whether the number of occurrences of binary "true" values in each bit position of the retrieved and corrected binary multi-bit values is odd or even.

13. The computer program of claim 12, wherein the computer executable instructions for converting the stored characteristic parameter values to the retrieved binary multi-bit values includes computer executable instructions for:

sensing shifted values of the characteristic parameter for each of the memory cells in the memory cell collection;

generating a probability distribution function of the characteristic parameter values for retrieved binary multi-bit values from the stored characteristic parameter values for each of the memory cells in the group of memory cells and the parity cell;

determining a probability that the stored characteristic parameter values from the group of memory cells and the parity cell are within the probability distribution function for each of the retrieved binary multi-bit values; and converting the stored characteristic parameter values from the group of memory cells and the parity cell into the retrieved binary multi-bit values and the multi-bit parity values for which the probability is highest.

14. The computer program of claim 12, further comprising computer executable instructions for transmitting an error indication if no error memory cell is identified having the corrected binary multi-bit value associated with the characteristic parameter band adjacent to the characteristic parameter band associated with the retrieved binary multi-bit value such that a second actual parity check value correctly indicates for the group of memory cells whether the number of occurrences of binary "true" values in each bit position of the retrieved and corrected binary multi-bit values is odd or even.

15. The computer program of claim 12, further comprising computer executable instructions for transmitting an error indication if the band probability of the error memory cell is above a maximum probability value.

16. The computer program of claim 12, wherein the computer executable instructions to identify the at least one error memory cell include computer executable instructions for comparing the band probability to a probability threshold value such that a memory cell having the band probability above the probability threshold value is not the error memory cell.

17. The computer program of claim 12, wherein the computer executable instructions for assigning the error memory cell the corrected binary multi-bit value include computer executable instructions for storing the corrected binary multi-bit in the memory cell corresponding to the error memory cell.

* * * * *